United States Patent [19]
Wallner

[11] Patent Number: 4,841,739
[45] Date of Patent: Jun. 27, 1989

[54] AUTOMOTIVE AIR-CONDITIONING SYSTEM AND APPARATUS

[75] Inventor: Rolf Wallner, Stuttgart, Fed. Rep. of Germany

[73] Assignee: Sueddeutsche Kuehlerfabrik Julius Fr. Behr BmgH. & Co. KG, Stuttgart, Fed. Rep. of Germany

[21] Appl. No.: 209,928

[22] Filed: Jun. 22, 1988

[30] Foreign Application Priority Data

Jun. 29, 1987 [DE]   Fed. Rep. of Germany ....... 3721388

[51] Int. Cl.⁴ .............................................. F25B 41/00
[52] U.S. Cl. ...................................... 62/174; 62/324.4
[58] Field of Search .............................. 62/174, 324.4; 123/41.27

[56] References Cited

U.S. PATENT DOCUMENTS

| | | | |
|---|---|---|---|
| 1,932,666 | 10/1933 | Hyatt | 13/30 |
| 3,248,895 | 5/1966 | Mauer | 62/174 X |
| 3,736,763 | 6/1973 | Garland | 62/174 X |
| 3,844,131 | 10/1974 | Granni et al. | 62/174 X |
| 4,096,706 | 6/1978 | Beckwith | 62/174 X |
| 4,179,898 | 12/1979 | Vakil | 62/174 X |
| 4,546,616 | 10/1985 | Drucker | 62/174 |

FOREIGN PATENT DOCUMENTS

30920   2/1985   Japan ...................... 62/174

*Primary Examiner*—William E. Tapolcai
*Attorney, Agent, or Firm*—Foley & Lardner, Schwartz, Jeffery, Schwaab, Mack, Blumenthal & Evans

[57] ABSTRACT

An apparatus for the air-conditioning of the interior of automobiles, with a refrigerant circuit, including a low-pressure part and a high-pressure part and in which vaporous refrigerant is drawn off from the evaporator by a compressor and, while experiencing an increase in pressure, the refrigerant is fed to a condenser for cooling and condensation. The condensed refrigerant is collected in a collecting vessel from which it can be diverted via an expansion valve into the evaporator while experiencing a pressure drop and cooling. A pressure-relief valve with a blow-out outlet is provided between the compressor and the condenser in the high-pressure part of the refrigerant circuit. The blow-out outlet of the pressure-relief valve is connected to an intermediate reservoir for the escaping refrigerant.

10 Claims, 1 Drawing Sheet

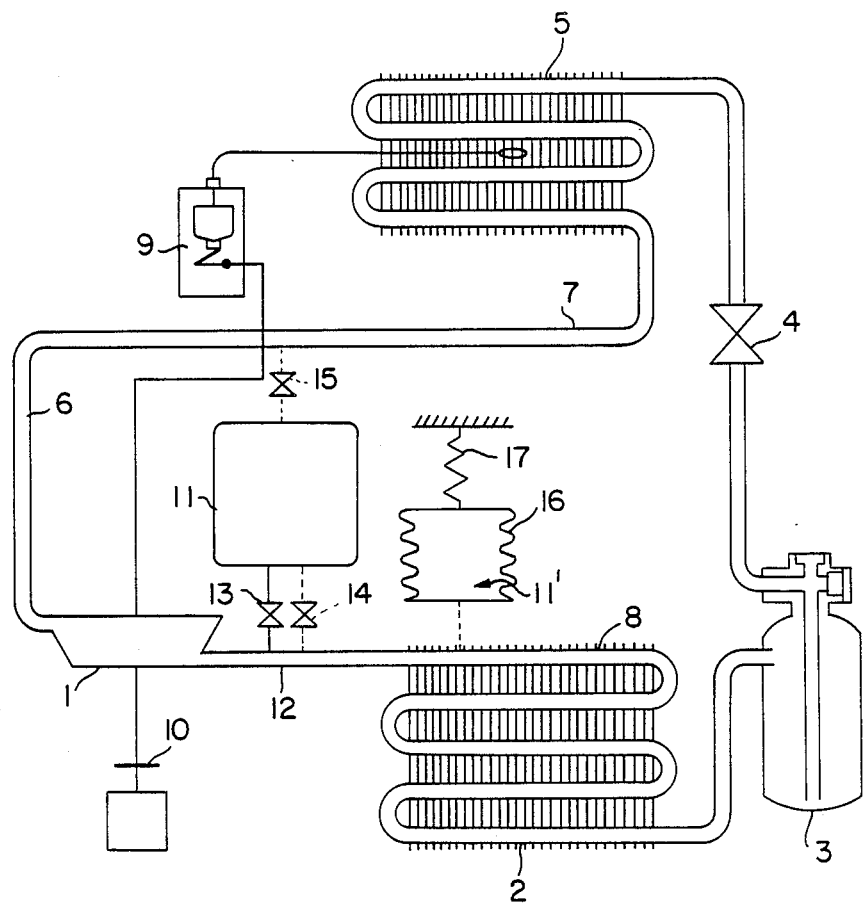

AUTOMOTIVE AIR-CONDITIONING SYSTEM AND APPARATUS

BACKGROUND OF THE INVENTION

The invention relates to an apparatus for the air-conditioning of the interior of automobiles, with a refrigerant circuit which consists of a low-pressure part and a high-pressure part and in which the vaporous refrigerant is drawn off from an evaporator by a compressor and, while experiencing an increase in pressure, is fed to a condenser for cooling and condensation, and the condensed refrigerant is collected in a collecting vessel, from which it can be diverted via an expansion valve into the evaporator, while experiencing a pressure drop and cooling, a pressure-release valve with a blow-off outlet being provided between the compressor and the condenser in the high-pressure part of the refrigerant circuit.

To allow such apparatuses to have as light-weight a construction as possible, the maximum pressure in the refrigerant circuit is limited by the pressure-release valve. In accordance with SAE standard J 639 applicable at the present time, the refrigerant pressure in an air-conditioning system of a vehicle may not exceed 35.5 bar for a refrigerant R12 and 44.4 bar for a refrigerant R22. When these pressures are exceeded, the refrigerant is blown off into the environment. According to the standard named, the high-pressure part of the refrigerant circuit must have a bursting pressure of at least 2.5 times the maximum pressure.

Under particularly adverse operating conditions, especially very high outside temperatures and the lack of any head wind and consequently a considerable break-down in the removal of heat, the maximum pressure can be exceeded and a blow-off of the refrigerant can occur. According to recent findings, the refrigerants conventionally used are harmful to the environment. Futhermore, the blownoff refrigerant is then lacking later when the apparatus is operating normally.

SUMMARY OF THE INVENTION

To avoid the disadvantages described, the object on which the invention is based is to find an apparatus, by means of which a specific pressure can be prevented from being exceeded without a blow-off of the refrigerant into the open, there being no need to make the constructional parts more pressure-resistant.

In accomplishing the foregoing object, there has been provided according to one aspect of the present invention a blow-off outlet of the pressure-release valve connected to an intermediate reservoir for the escaping refrigerant. When the permissible pressure is exceeded, refrigerant can blow off into the intermediate reservoir in order to reduce the pressure in the high-pressure part of the refrigerant circuit, so that, even when there is a further increase in temperature, no further rise in pressure can occur any longer in the high-pressure part. The refrigerant intercepted in the intermediate reservoir can be returned into the refrigerant circuit later and reused, and harm to the environment caused by escaping refrigerant is prevented.

The size of the intermediate reservoir depends on the refrigerant used, on the volume of the apparatus, on the maximum possible outside temperature to which the vehicle can be exposed, and on the set maximum pressure in the high-pressure part of the apparatus.

To ensure a particularly simple return of the refrigerant into the refrigerant circuit, there can be parallel to the pressure-release valve a return valve which takes effect on one side and by means of which the intermediate reservoir can be emptied again at least partially when the pressure in the high-pressure part fails. The pressure-release valve and the return valve can be integrated in a space-saving way as a structural unit, for example if the return valve is built into the valve body of the pressure-release valve.

Another possibility for the return of the refrigerant is for the intermediate reservoir to be connected to the suction line of the compressor, preferably via a temperature-controlled and/or pressure-controlled discharge valve.

An especially simple adaptation to different operating conditions can be achieved if the receiving volume of the intermediate reservoir is variable. If appropriate, here the intermediate reservoir can be connected to the high-pressure part of the refrigerant circuit directly without a pressure-release valve.

The intermediate reservoir can be designed as a gas reservoir, with a storage chamber for the refrigerant and with a hemetically sealed gas chamber, the two chambers being separated from one another by means of an elastic diaphragm. Such gas-reservoir constructions are used in hydraulic systems or as pressure-compensating vessels in hot-water heating systems.

In another embodiment, the intermediate reservoir can be designed in a concertina-like manner such as a bellows. At the same time, the longitudinal extension of the bellows can be influenced by at least one spring, prestressed if appropriate, and the prestress of the spring can be adjustable for adaptation to different operating conditions and types of apparatus.

The foregoing and other aspects will become apparent from the following detailed descriptions of the invention when considered in conjunction with the accompanying drawings.

BRIEF DESCRIPTION OF THE DRAWINGS

The FIGURE illustrates the automotive air-conditioning system and apparatus of this invention.

DETAILED DESCRIPTION OF THE PREFERRED EMBODIMENTS

The vehicle air-conditioning system illustrated diagrammatically has a compressor 1 which pumps gaseous refrigerant, while increasing its pressure, into a condenser 2. The refrigerant condenses and at the same time cools and flows into a collecting vessel 3. After filtration and water removal, the condensed refrigerant can, via an expansion valve 4, expand in an evaporator 5, while experiencing a pressure drop, at the same time absorbing ambient heat. The evaporated refrigerant is sucked out of the evaporator 5 through a suction line 6 by the compressor 1, compressed and returned to the circuit in the condenser 2.

A low-pressure part 7 of the refrigerant circuit comprises the evaporator 5 and the suction line 6 up to the compressor, while a high pressure part 8 comprises the condenser and the collecting vessel 3. The compressor 1 can be cut in and cut out via a temperature switch 9, for example via a magnetic coupling 10.

In order to limit the pressure in the highpressure part 8 at an especially high ambient temperature, which does not normally occur, an intermediate reservoir 11 for the compressed, but not yet condensed refrigerant is connected to the delivery line 12 of the compressor 1, specifically via a pressure-release valve 13 which makes the connection between the delivery line 12 and the intermediate reservoir 11 when a predetermined maximum pressure is exceeded. So that the intermediate reservoir 11 can be emptied again at least partially, there is, as represented by broken lines, a return valve 14 which can be combined with the pressure-release safety valve 13.

As also shown, instead of the return valve 14 there can be a discharge valve 15 which can connect the intermediate reservoir 11 to the suction line 6. This can take place in a temperature-controlled manner, when the ambient temperature falls again or when a sufficiently low pressure prevails in the low-pressure part 7. At all events, it is necessary to prevent the pressure from rising undesirably in the low-pressure part 7 in the critical operating situation. The intermediate reservoir 11 can be a normal gas-holding vessel, the volume of which is calculated according to the size of the system, the expected maximum temperature and the refrigerant used. The intermediate reservoir 11 can also be provided as a gas reservoir known per se, with a pressure-compensating chamber closed off by means of a diaphragm.

Instead of the intermediate reservoir 11, there can alternately be provided a variable-volume intermediate reservoir 11' the wall of which can be provided, for example, in a concertina-like manner such as a bellow 16. The vessel 11' then has to be installed so as to be of variable length, the change in length also being limited by a spring 17, the prestress of which is, where appropriate, adjustable.

What is claimed is:

1. A vehicle air-conditioning system comprising:
   compressor means for pumping a gaseous refrigerant into a condenser and increasing the pressure thereof;
   means for collecting condensed refrigerant from the condenser;
   means for expanding the condensed refrigerant, decreasing the pressure thereof and increasing the absorbtion of ambient heat thereof;
   means for returning the evaporated refrigerant to the compressor;
   means for operably switching the compressor in and out of the system;
   a delivery line interconnecting the compressor and the condenser; and
   safety means for relieving excess pressures in the air conditioning system comprising:
   a. intermediate means connected to the delivery line for retaining compressed but uncondensed refrigerant; and
   b. valve means for interconnecting the intermediate means and the delivery line said valve means opening to permit refrigerant to flow from said delivery line into said intermediate means when the pressure in the delivery line exceeds a predetermined maximum level.

2. The system of claim 1 wherein said excess pressure relieving means further includes a return valve connected to said delivery line in parallel with said valve means.

3. The system of claim 1 including:
   a suction line; and
   a discharge valve interconnecting the intermediate means and the suction line.

4. The system of claim 1 wherein the intermediate means has a variable volume.

5. The system of claim 4 including:
   resilient means for limiting the variable volume of the intermediate means.

6. An air-conditioning apparatus comprising:
   a low pressure portion including an evaporator connected to a suction line;
   a high pressure portion including a condenser and a collecting vessel;
   a compressor;
   a delivery line interconnecting the compressor and the condenser;
   an expansion valve connected between the collecting vessel and the evaporator;
   switch means for actuating the compressor; and
   safety means for relieving excess pressures in the air-conditioning apparatus, comprising:
   a. intermediate means connected to the delivery line for retaining compressed but uncondensed refrigerant; and
   b. valve means for interconnecting the intermediate means and the delivery line said valve means opening to permit refrigerant to flow from said delivery line into said intermediate means when the pressure in the delivery line exceeds a predetermined maximum level.

7. The apparatus of claim 6 including:
   a return valve connected to said delivery line in parallel with the valve means.

8. The apparatus of claim 6 including:
   a discharge valve interconnecting the intermediate means with the suction line.

9. The apparatus of claim 6 wherein the intermediate means has a variable volume.

10. The apparatus of claim 9 including:
    resilient means for limiting the variable volume of the intermediate means.

* * * * *